United States Patent [19]
Harada et al.

[11] Patent Number: 5,803,865
[45] Date of Patent: Sep. 8, 1998

[54] GEAR SHIFT CONTROL SYSTEM FOR AUTOMATIC TRANSMISSION

[75] Inventors: Shingo Harada; Yuji Shitani; Tetsuya Kyakuno; Tetsuro Takaba; Hidetoshi Nobumoto; Kazuo Sasaki, all of Hiroshima, Japan

[73] Assignee: Mazda Motor Corporation, Hiroshima, Japan

[21] Appl. No.: 706,210

[22] Filed: Aug. 30, 1996

[30] Foreign Application Priority Data

Aug. 31, 1995 [JP] Japan .................................. 7-248685
Aug. 5, 1996 [JP] Japan .................................. 8-223140

[51] Int. Cl.$^6$ .................................................. F16H 61/00
[52] U.S. Cl. ........................... 477/119; 477/118; 477/94; 477/901; 477/120
[58] Field of Search ...................... 477/118, 119, 477/120, 92, 94, 901

[56] References Cited

U.S. PATENT DOCUMENTS

| | | | |
|---|---|---|---|
| 5,022,286 | 6/1991 | Takizawa | 477/119 |
| 5,044,230 | 9/1991 | Shinya et al. | 477/119 |
| 5,097,725 | 3/1992 | Sawa | 477/129 |
| 5,105,923 | 4/1992 | Iizuka | 477/119 X |
| 5,203,235 | 4/1993 | Iizuka | 477/118 X |
| 5,231,897 | 8/1993 | Morita | 477/120 |
| 5,317,937 | 6/1994 | Yoshizawa et al. | 477/120 |
| 5,484,350 | 1/1996 | Ishikawa et al. | 477/120 X |
| 5,531,654 | 7/1996 | Ishikawa et al. | 477/120 |
| 5,591,101 | 1/1997 | Sakakiyama et al. | 477/906 X |
| 5,618,243 | 4/1997 | Kondo et al. | 477/118 |

FOREIGN PATENT DOCUMENTS 571626  3/1993  Japan .

Primary Examiner—Khoi Q. Ta
Assistant Examiner—Peter T. Kwon
Attorney, Agent, or Firm—Sixbey, Friedman, Leedom & Ferguson, P.C.; Gerald J. Ferguson, Jr.

[57] ABSTRACT

An automatic transmission control system, which applies an ordinary gear shift control map set up for flat road driving and a downgrade gear shift set up for downgrade driving which has broadened range of driving conditions for lower gears, causes gear shifts according to the ordinary gear shift control map even during downward driving when an accelerator pedal is stepped on with intention of accelerating the vehicle.

14 Claims, 12 Drawing Sheets

GEAR SHIFT CONTROL SYSTEM FOR AUTOMATIC TRANSMISSION

BACKGROUND OF THE INVENTION

1. Field of the Invention

The invention relates to a control system for performing gear shift control of an automotive automatic transmission according to a scheduled or prearranged gear shift characteristic having a range of lower gears wider for downgrade driving than for flat road driving, and more particular, to an automotive automatic transmission control system for removing gear shift control according to a scheduled gear shift characteristic set up for downgrade driving even during driving a downgrade when an accelerator pedal is stepped on.

2. Description of Related Art

Automotive automatic transmission control systems conventionally apply control maps of prearranged gear shifts in relation to vehicle speed and throttle opening as parameters on the basis of which suitable gears are selectively changed.

Some automatic transmission control systems of this type apply an ordinary gear shift control map for gear shifts set up for flat road driving conditions and a downgrade gear shift control map for gear shifts set up for downgrade driving conditions. In such an automatic transmission control system, vehicle speeds for which the downgrade gear shift control map provides gear shifts are set higher than those for which the ordinary gear shift control map provides the same gear shifts so as to broaden ranges of vehicle speeds for lower gears. A suitable gear shift is executed based on the downgrade gear shift control map to apply engine braking more effectively even when the vehicle changes its speed at a deceleration rate greater than a specified rate due to applying footbrake while the vehicle is driving on a downgrade. Alternatively, the utilization may be made of a variable gear shift control map which is variably set up to provide each gear shift in a range of vehicle speeds expanded broader for downgrade driving than for flat road driving.

In cases where the gear shift control is achieved according to the downgrade gear shift control, a downshift to a lower gear is caused with a greater effect of providing engine braking. There are, however, cases where, the driver experiences a feeling in situation that engine braking is not always necessary. In such a case, if the gear shift control is continued according to the downgrade gear shift control map, driving is not always satisfactory and a gear shift caused based on the downgrade gear shift control map gives the driver an unpleasant feeling.

There has been proposed in, for instance, Japanese Unexamined Patent Publication No. 5-71626 a gear shift control system in which gear shift control in accordance with an ordinary gear shift control map is resumed when an engine throttle (engine load) reaches opening greater than specified opening as a result of operation of an accelerator pedal even while the vehicle is traveling on a downgrade. This is because a change in engine throttle opening greater than the specified opening results from stepping on the accelerator pedal with the intention of evading application of engine braking and accelerating the vehicle. Upon an occurrence of a demand for acceleration during downgrade driving, removing the gear shift control based on the downgrade gear shift control map meets driver's intention and provides an improved driver's feeling of driving.

If the gear shift control based on the downgrade gear shift control map is removed during downgrade driving, a gear shift is caused rather toward a higher gear. For instance, if the vehicle enters a downgrade with a fourth gear, the gear is shifted down to the third by the downgrade gear shift control and is subsequently shifted up to the fourth gear resulting from suspension of the downgrade gear shift control. Similarly, if the vehicle enters a downgrade with a third gear, the gear is shifted down to the second by the downgrade gear shift control and subsequently returns to the third gear resulting from suspension of the downgrade gear shift control.

With the prior art gear shift control, because the specified throttle opening, which is a condition of removal of the downgrade gear shift control, is fixed irrespective of a gear to which a down shift has been made by the downgrade gear shift control or a gear having been created before removal of the downgrade gear shift control, irrespective of a down shift to the second gear or to the third gear, stepping on the accelerator pedal by a specified stroke removes the downgrade gear shift control and causes an up shift to the fourth gear or to the third gear. As a result, the downgrade gear shift control encounters hunting between execution and removal, providing aggravation of driving performance of the vehicle. That is, when the downgrade gear shift control is removed after it has caused a down shift to the third gear, the gear is shifted up to the fourth which provides less effective engine braking. In cases where the vehicle continues to travel on a downgrade with the fourth gear, the driver has to apply footbrakes in a short period of time. As a result, the downgrade gear shift control is resumed. In such a way, the downgrade gear shift control is frequently removed and resumed. For this reason, in order the downgrade gear shift control to make it hard to cause a shift up from the third gear to the fourth gear after a down shift to the third gear, it is desirable to make the condition of removal of the downgrade gear shift control more strict, or to increase the specified throttle opening.

Applying a more strict condition to removal of the downgrade gear shift control imposes restriction on the control in cases where the downgrade gear shift control causes a down shift to the second gear. Because the second gear provides more effective engine braking, in events where a downgrade changes its slope more gentle, engine braking tends to effect in excess. Consequently, if the downgrade gear shift control is hardly removable, the vehicle encounters aggravation of driving performance due to continuous apply of excessive engine braking. Because of hunting of the downgrade gear shift control between execution and removal, making the removal condition of the downgrade gear shift control less strictly must be evaded.

SUMMARY OF THE INVENTION

It is an object of the invention to provide an automatic transmission gear shift control system which incorporates gear shift control in which an ordinary gear shift control map and a downgrade gear shift control map are interchangeably employed according to road conditions.

It is another object of the invention to provide an automatic transmission gear shift control system in which, even during driving on a downgrade, the ordinary gear shift control map is employed in the gear shift control in response to driver's intention of accelerating the vehicle.

These objects of the invention are accomplished by providing a gear shift control system to execute the gear shift control of an automotive vehicle automatic transmission which employs an ordinary gear shift control map during ordinary road driving and a downgrade gear shift control map, in which ranges of driving conditions for lower gears are defined broader than in the ordinary gear shift control map, during driving on a downgrade having a slope angle greater than a specified angle. The gear shift control system employs the ordinary gear shift control map in the gear shift control even during driving on a downgrade when a change in vehicle speed per unit time exceeds a reference speed change, or when a time for which an accelerator pedal remains stepped on or depressed exceeds a reference time, at a time immediately after depression of an accelerator pedal greater than a reference amount of depression. The amount of depression of the accelerator pedal may preferably be detected in the form of opening of an engine throttle valve.

The reference change is changed greater with an increase in slope angle and/or with an increase in vehicle speed at a time immediately after the accelerator pedal is stepped on or depressed more than the reference amount of depression. The reference time is changed longer with an increase in slope angle and/or, however, with a decrease in the amount of depression of the accelerator pedal.

The gear shift control system may hold the ordinary gear shift control map employed in the gear shift control even during driving on a downgrade unless a footbrake pedal is stepped on.

With the gear shift control system of the invention, interchange from the downgrade gear shift control map to the ordinary gear shift control map during downgrade driving takes place only after the accelerator pedal is stepped on more than the reference amount of depression and the vehicle attains a speed change greater than the reference speed change. In other words, in an event where the accelerator pedal is continuously stepped on until the vehicle speeds up greatly or strongly stepped on to accelerate greatly the vehicle, this indicates that no engine brake is needed even during downgrade driving, then, the gear shift control employs the ordinary gear shift control map. As a result, the driver's intention of accelerating the vehicle even during downgrade driving is reflected in the gear shift control, and favorable drive feelings are realized.

Setting the reference speed change to greater values with an increase in slope angle prevents the interchange from the downgrade gear shift control map to the ordinary gear shift control map during driving on a sharp downgrade where the vehicle is in need of engine brakes unless the vehicle attains a considerably high speed or is greatly accelerated. As a result, the vehicle can drive with engine brakes applied effectively as much as possible. Conversely, during driving on a gentle downgrade, the interchange from the downgrade gear shift control map to the ordinary gear shift control map during downgrade driving takes place even before the vehicle attains a high speed or is somewhat significantly accelerated, removing engine brakes a little earlier.

Setting the reference speed change to greater values with an increase in vehicle speed at a time immediately after the accelerator pedal is depressed more than the reference amount of depression, with an effect of making the interchange to the ordinary gear shift control map from the downgrade gear shift control map be hardly caused while the vehicle is traveling at high speeds. this results in removal of enhanced shift shocks which are caused during downshifts to lower gears which provide more effective engine braking in such a case that, while the vehicle remains a high speed, the control system has once exercised interchange from the downgrade gear shift control map to the ordinary gear shift control map and, subsequently, resumes the gear shift control in accordance with the downgrade gear shift control map.

Together, with the gear shift control system of the invention, since the ordinary gear shift control map is continuously employed even during driving on a downgrade unless a footbrake pedal is stepped on, the vehicle remains driving stability in lower gears which provide more effective engine braking. Furthermore, since the downgrade gear shift control map is employed in response to depression of the footbrake pedal which is evidence of the driver having tried to slow down the vehicle, gear shifts during downgrade driving reflect the driver's intention of decelerating the vehicle.

According to another aspect of the invention, the gear shift control system resumes the ordinary gear shift control following removal of the downgrade gear shift control when the vehicle changes its speed at an acceleration rate greater than a specified rate even during downgrade driving. This specified acceleration rate is altered so as to be exceeded more easily as the operating gear becomes lower.

BRIEF DESCRIPTION OF THE DRAWINGS

The above and other objects and features of the invention will be clearly understood from the following description with respect to preferred embodiments thereof when considered in conjunction with the accompanying drawings, in which:

FIG. 8 is a graphical diagram showing a relationship between a reference rate A and a deceleration rate a;

DETAILED DESCRIPTION OF THE SPECIFIC EMBODIMENTS

Because automatic transmissions and engines and their related mechanisms and elements are well known, the present description will be directed in particular to elements forming part of, or cooperating directly with, the control system in accordance with the invention. It is to be understood that mechanisms and elements not specifically shown or described can take various forms well known to those skilled in the art.

Figure 1:
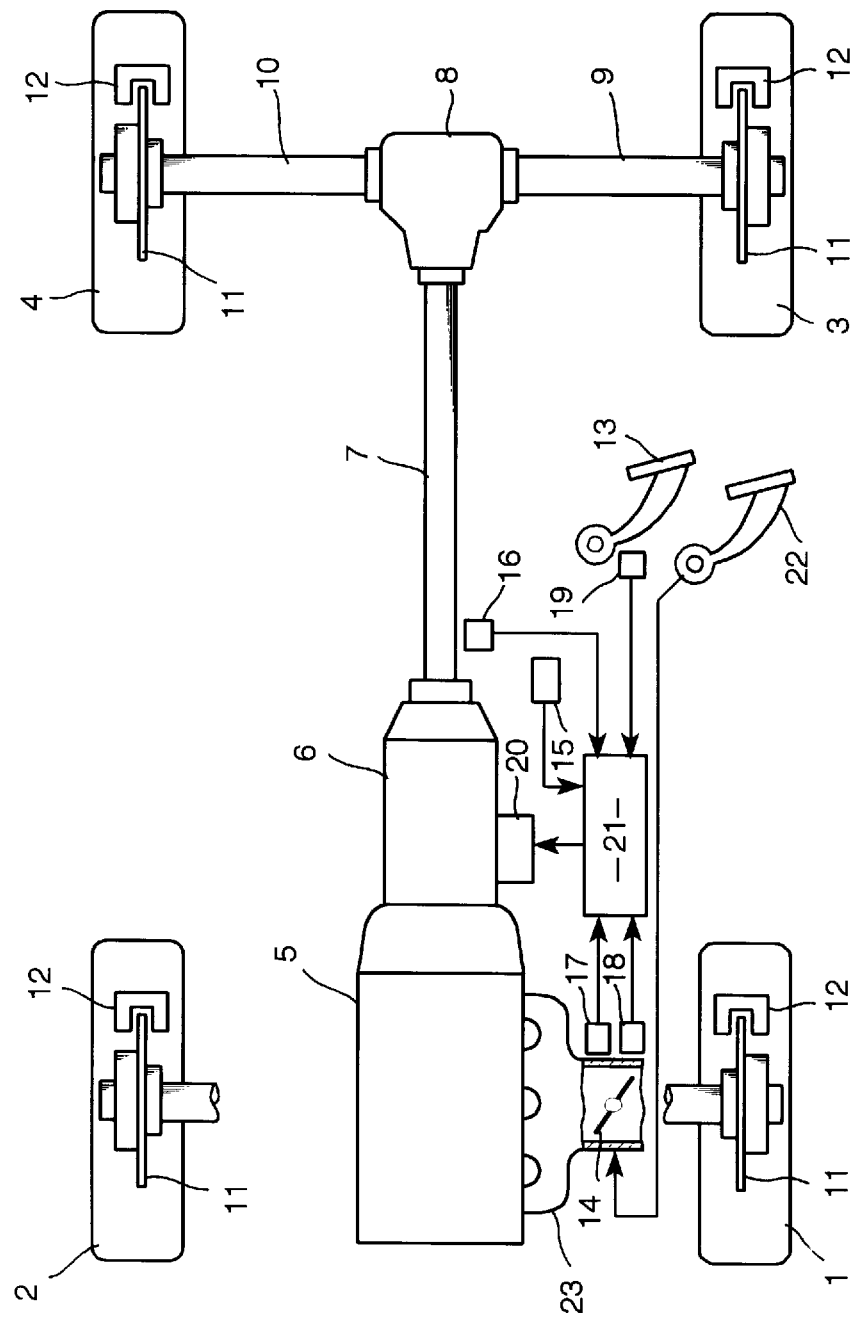
FIG. 1 is a schematic illustration of a vehicle equipped with an automatic transmission control system in accordance with a specific embodiment of the invention.

Referring to the drawings in detail, in particular, to FIG. 1 schematically showing a vehicle to which an automatic transmission control system is installed, the vehicle is equipped with an engine 5 which supplies driving force to left and right rear drive wheels 3 and 4 through drive axles 9 and 10 via a multiple gear automatic transmission 6, a propeller shaft 7 and a differential gear 8. The engine 5 is provided with an intake manifold 23 equipped with an engine throttle value 14 which is linked to and operated by a driver-controlled accelerator pedal 22 to be controlled in opening with the result of regulating the amount of intake air supplied to the engine 5 on the basis of which engine output torque is controlled. A speed sensor 16 is provided adjacent to the automatic transmission 6 to monitor a rotational speed of the propeller shaft 7 as a vehicle speed.

Each of left and right front driven wheels 1 and 2 and left and right rear driving wheels 3 and 4 is equipped with a brake disk 11 operationally integrated to each wheel and a brake caliper 12, the speed of the brake disk 11 being controlled by the brake caliper 12 according to braking force supplied to the brake caliper 12. Depression of a footbrake pedal 13 pressurizes the brake calipers 12 in a manner as to control rotational speeds of the wheels 1 through 4. This footbrake sensor 19, which is installed in proximity to the footbrake pedal 13, monitors a depressed stroke of the footbrake pedal 13 to output a signal denoting the depressed stroke to a control unit 21 of the automatic transmission 6. An idle position sensor 18 is installed in proximity to the throttle valve 12 to output a signal when the throttle valve 12 is in its idle position. Denoted by a numeral 15 is a slope sensor for monitoring a slope of a downgrade road on which the vehicle is traveling or an angle of inclination of the vehicle which is substituted for a slope of the downgrade road. Based on incoming signals, the control unit 21 outputs a gear shift signal to a shift unit 20. All these sensors 15–19 are known in various types and may take any well known types.

Figure 2:
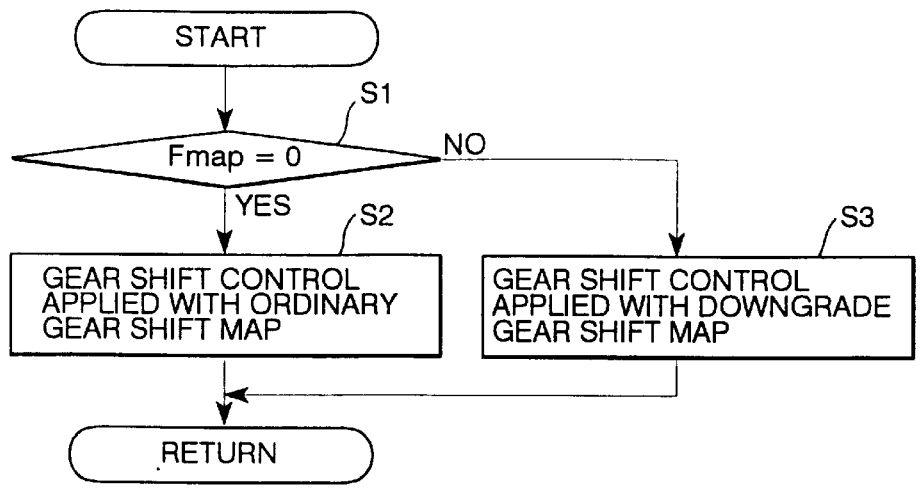
FIG. 2 is a flowchart illustrating the gear shift control routine.
Figure 3:
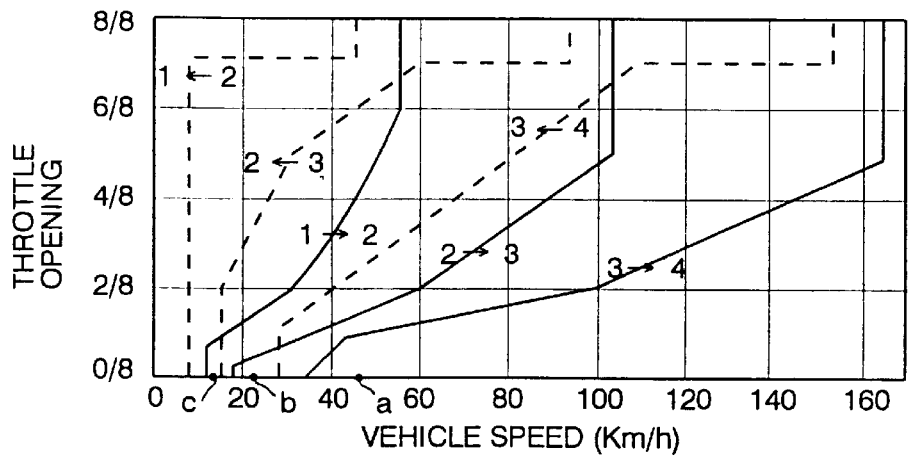
FIG. 3 is an ordinary gear shift control map set up for ordinary or flat road driving.

Control unit 21 always repeats a gear shift control sequential routine illustrated by a flowchart shown in FIG. 2. Specifically, the flowchart logic commences and control passes directly to a functional block at step S1 where a determination is made as to the state of a map flag Fmap which will be described detail later. When the map flag Fmap is down or in a state of "0," the gear shift control is executed in accordance with an ordinary gear shift control map, such as shown in FIG. 3, set up for flat road driving at step S2. On the other hand, when the map flag Fmap is up or in a state of "1," the gear shift control is executed in accordance with a downgrade gear shift control map, such as shown in FIG. 3, set up for downgrade driving at step S3.

Figure 4:
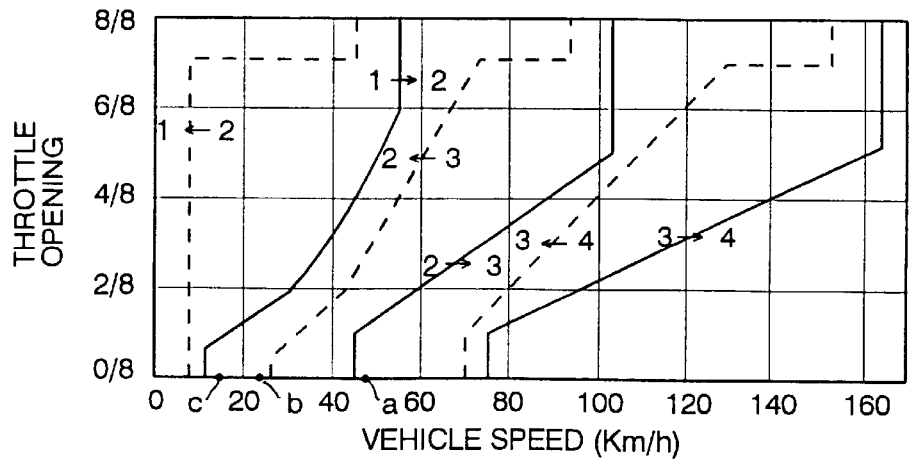
FIG. 4 is a downgrade gear shift control map set up for downgrade driving.

As shown in FIGS. 3 and 4, each gear shift control map is set up to provide appropriate gear shifts according to driving conditions including vehicle speed and throttle opening. In this instance, the ordinary gear shift control map shown in FIG. 3 is set up to define gear shift lines suitably for smooth gear shifts during flat road driving. The downgrade gear shift control map shown in FIG. 2 is, however, set up to provide a broadened range of vehicle speed for a lower gear shift. In other words, the downgrade gear shift control map causes higher gear shifts, including a second-to-third gear shift line, a third-to-fourth gear shift line, a fourth-to-third gear shift line and a third-to-second gear shift line, on sides of higher vehicle speeds as compared with the ordinary gear shift control map. Accordingly, a gear to which the automatic transmission is shifted in accordance with the downgrade gear shift control map is lower than a gear according to the ordinary gear shift control map even for the same vehicle speed and the same throttle valve opening.

For instance, in a driving condition indicated by a label "a" in these figures, the gear shift control selects a gear shift to the fourth gear on the ordinary gear shift control map or to the third gear on the downgrade gear shift control map. In a driving condition indicated by a label "b" in these figures, the gear shift control selects a gear shift to the third gear on the ordinary gear shift control map or to the second gear on the downgrade gear shift control map. Because, in this embodiment, gear shift lines between the first and second gears are identical with each other on both gear shift control maps, the second gear, which is able to provide more effective engine braking, is selected for a driving condition such as shown by a label "c," on both ordinary gear shift control map and downgrade gear shift control map.

Figure 5:
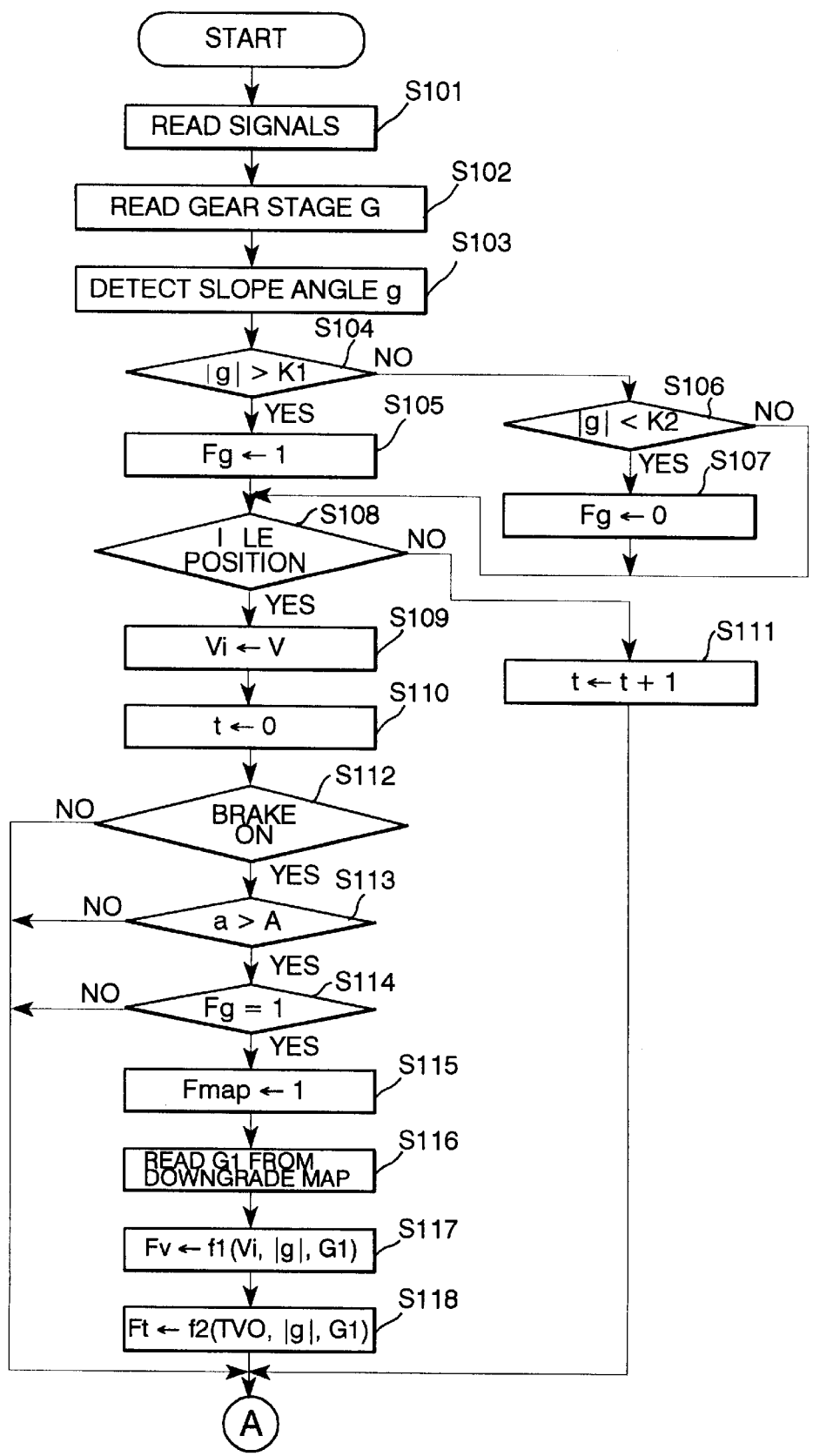
FIGS. 5 and 6 is a flowchart illustrating the map flag control routine.
Figure 6:
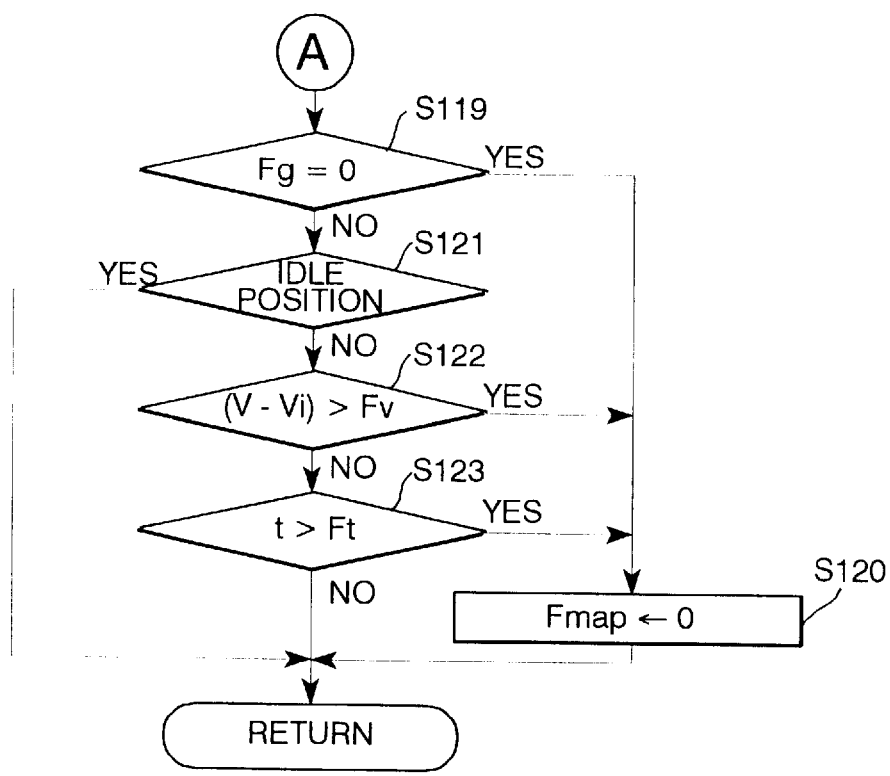

Map flag Fmap is set up or reset down by means of a flag control sequential routine illustrated by a flowchart shown in FIGS. 5 and 6. This flag control sequential routine is executed separately from the gear shift control sequential routine and periodically repeated, for instance, every 20 milliseconds. The map flag Fmap is read at a specified interval or every cycle of the flag control sequential routine. Summarizing the flag control sequential routine, the map flag Fmap is reset to the state of "0" when it is determined that the vehicle is traveling on a flat road, or set to the state of "1" when it is determined that the vehicle is traveling on a downgrade on condition that the footbrake pedal 13 is stepped on or depressed with the intention of decelerating the vehicle. Further, even while the map flag Fmap has been to the state of "1", when the vehicle increases its speed to a greater extent after depression of the accelerator pedal 22 or when depression of the accelerator pedal 22 of long duration occurs, the map flag Fmap is reset to the state of "0".

Figure 7:
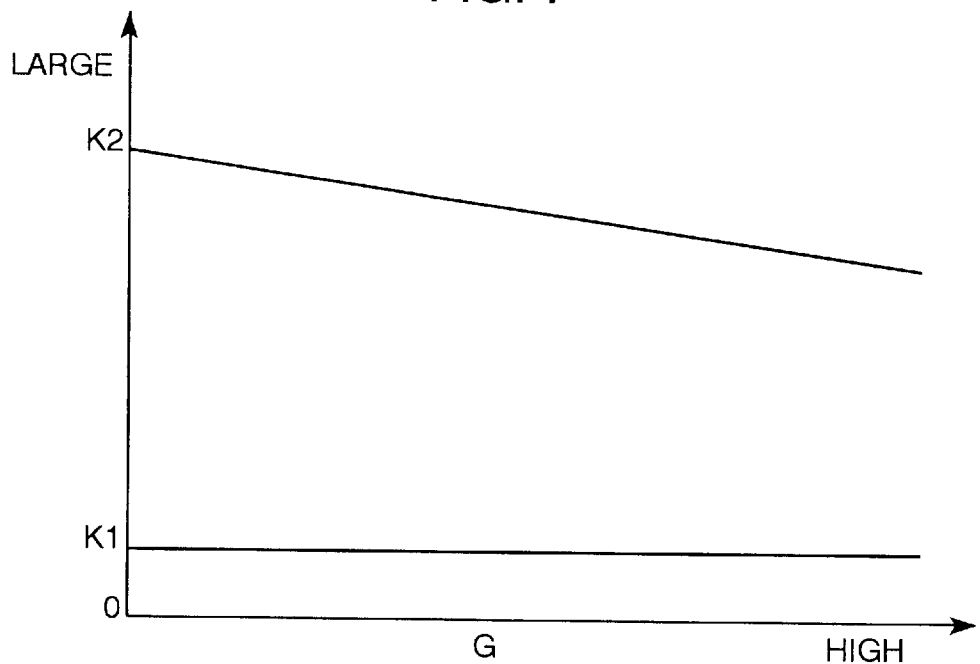
FIG. 7 is a graphical diagram showing relationships between first and second reference angles K1 and K2 and a slope angle g.

Referring to FIG. 5, the flowchart logic commences and control passes directly to a function block at step S101 where signals are read in from various sensors 15–19. Subsequently, at step S101, a gear G in which the transmission is placed is read in from an updated gear signal which is output to the shift unit 20 according to either one of the ordinary and downgrade gear shift control maps shown in FIGS. 3 and 4, and, at step S102, a slope angle g in degree is determined based on a signal from the slope sensor 15 at step S103. In this instance, the gear G may be found based on a ratio between rotational speeds of input and output shafts of the automatic transmission 6 in place of the gear signal. The slope is represented by a minus angle for a downgrade and increases with an increase in an absolute value of angle, and a flat road is represented by an angle of 0 (zero). On the basis of the slope angle g, a determination as to whether the vehicle is traveling on a flat road or on a downgrade at steps S104 through S107. Specifically, a determination is made at step S104 as to whether the slope angle g is less than a first specified reference angle K1 which has a relatively small minus value and is used as a threshold value of downgrade judgement. As shown in FIG. 7, the first reference angle K1 linearly varies smaller as the shift gear G becomes lower. Consequently, the answer to the decision tends to be affirmative more easily as the shift gear G becomes higher. The first reference angle K1 may vary smaller in stepwise as the shift gear G becomes lower. If the slope angle g is greater than the first reference angle K1, a slope flag Fg is set to a state of "1," this indicates that the road on which the vehicle is driving is a downgrade, at step S105. On the other hand, if the slope angle g is less than the first reference angle K1, another determination is made at step S106 as to whether the slope angle g is less than a second specified reference angle K2 which is smaller than the first reference angle K1 and as close to 0 (zero) as possible as shown in FIG. 7. This second reference angle K2 is used as a threshold value of judgement of whether the road on which the vehicle is driving is considerably gentle or regarded as a flat road. The slope flag Fg is reset to a state of "0" at step S107 if the slope angle g is less than the second reference angle K2. On the other hand, the slope flag Fg remains as previous if the slope angle g is greater than the second reference angle K2 and, however, less than the first reference angle K1. The utilization of these first and second reference angles K1 and K2 provides a hysteresis for holding the slope flag Fg unchanged in state for slope angles between the reference angles K1 and K2, preventing the slope flag Fg from hunting between the states of "1" and "0".

Thereafter, a provisional routine takes place at steps S108 through S111 to reset the map flag Fmap to the state of "0" from the state of "1". At step S108, a determination is made as to whether the idle position sensor 18 outputs a signal denoting the idle position of the engine throttle valve 14, i.e. whether the accelerator pedal 22 is released. When the engine throttle valve 14 is in its idle position, the vehicle speed V read in at step S101 is substituted for an ex-idling vehicle speed Vi at step S109. This ex-idling vehicle speed Vi is updated as long as the accelerator pedal 22 is released, and updating the idling speed is interrupted while the accelerator pedal 22 remains depressed, as will be described later. Accordingly, the ex-idling vehicle speed Vi remains as a vehicle speed V at depression of the accelerator pedal 22. After substituting the vehicle speed V read in at step S101 for the ex-idling vehicle speed Vi at step S109, a time counter resets its count t to zero (0) at step S110. On the other hand, when the engine throttle valve 14 is out of the idle position, ie. when the accelerator pedal 22 remains depressed, the time counter changes its count t by an increment of one (1) at step S11. The time counter counts up as long as the accelerator pedal 22 is continuously stepped on and is reset to clear its count t when the accelerator pedal 22 is released. As apparent, the count t indicates how long the accelerator pedal 22 is continuously stepped on.

Figure 8:
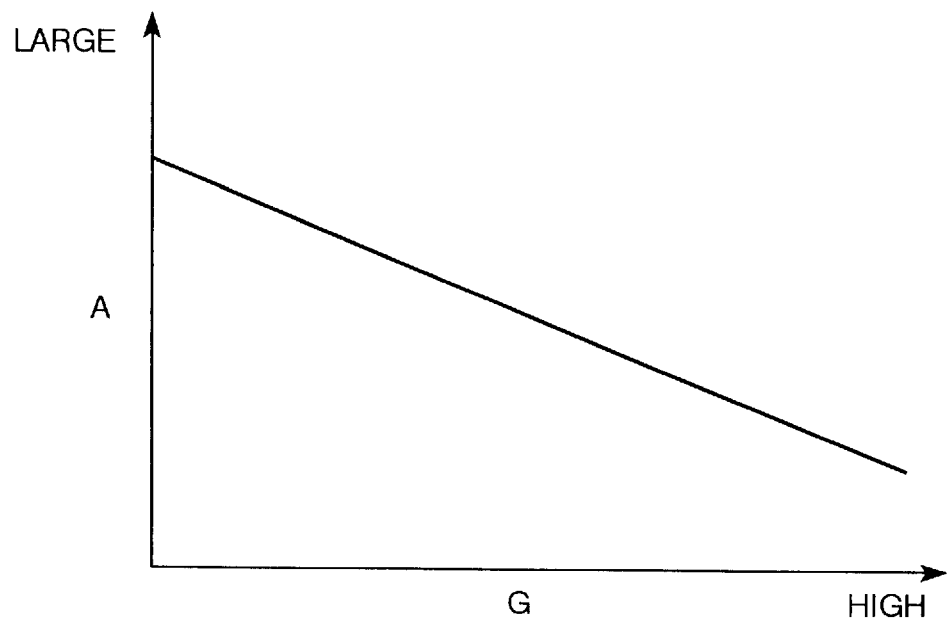

Subsequently to the provisional routine, a map flag Fmap setting routine takes place at steps S112 through 115. After having reset the time counter to zero (0) at step S110, a determination is made at step S112 as to whether the footbrake sensor 19 outputs a signal denoting that the footbrake pedal 13 is stepped on. When the footbrake pedal 13 is stepped on, another determination is subsequently made based on a change in vehicle speed V as to whether the vehicle experiences acceleration at an acceleration rate a greater than a reference deceleration rate A resulting from the application of footbrakes at step S113. As shown in FIG. 8, the reference deceleration rate A linearly varies smaller as the shift gear G becomes higher. Consequently, the answer to the decision tends to be affirmative more easily as the shift gear G becomes higher. Further, the reference deceleration rate A may vary smaller in stepwise as the shift gear G becomes higher.

When the answer to the determination made at step S113 is "YES," a determination as to the slope flag Fg at step S114. When the slope flag Fg has been to the state of "1", this indicates that the vehicle is driving on a downgrade, then, the map flag Fmap is set to the state of "1" at step S115. Whenever the answer to any one of the determinations at step S112, S113 and S114 is "NO," that is, when the footbrake pedal 13 is released, when the vehicle is not decelerated at a rate greater than the reference deceleration rate A, or when the road is regarded to be flat, the map flag Fmap remains as previous.

After having set the map flag Fmap to the state of "1" at step S15, the control routine proceeds to steps S116 through S118 where reference values are established to judge whether the map flag Fmap may be reset to the state of "0" from the state of "1".

Figure 9:
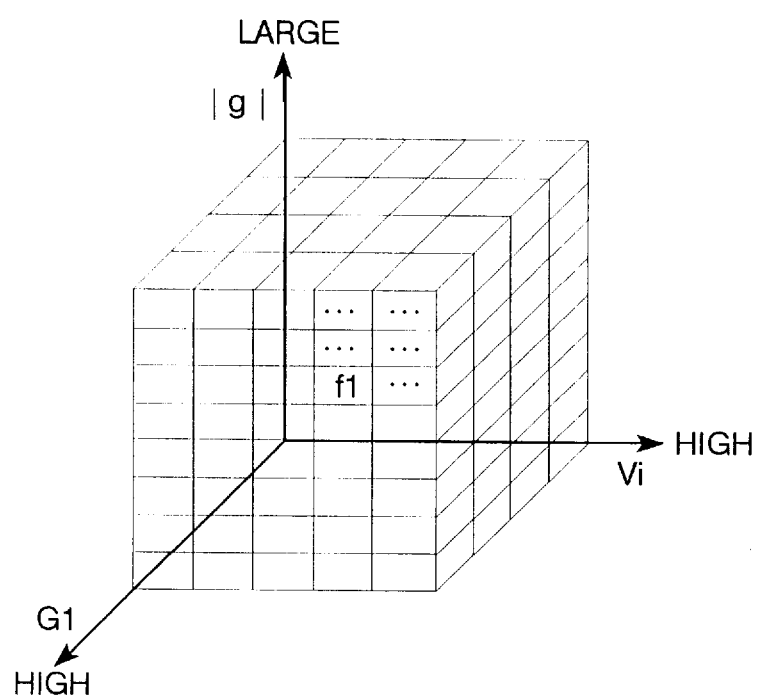
FIG. 9 is a conceptual table showing a relationship of a function f1 to slope angle g, vehicle speed Vi and operating gear G1.
Figure 10:
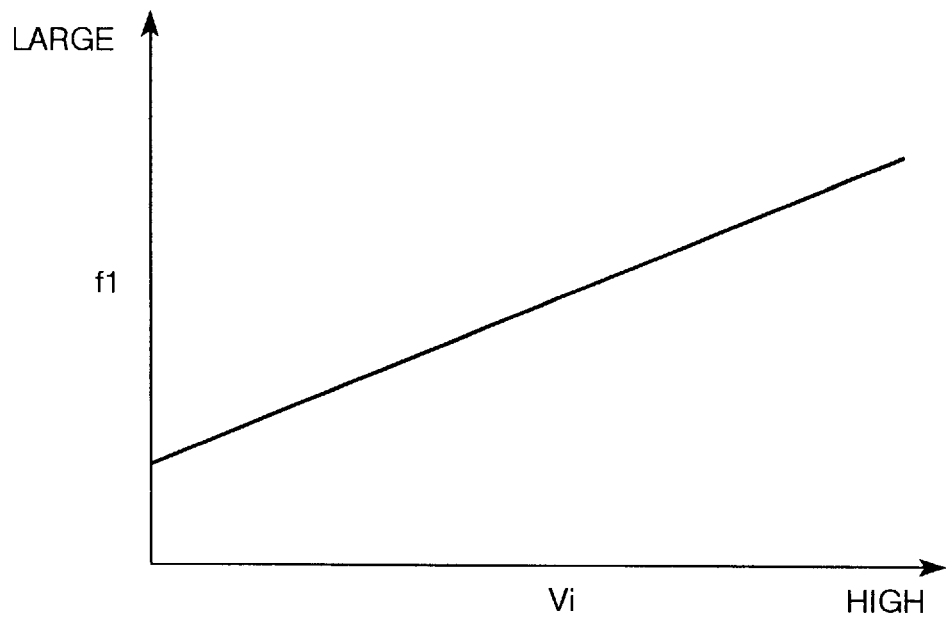
FIG. 10 is a graphical diagram showing a relationship between the function f1 and vehicle speed Vi.
Figure 11:
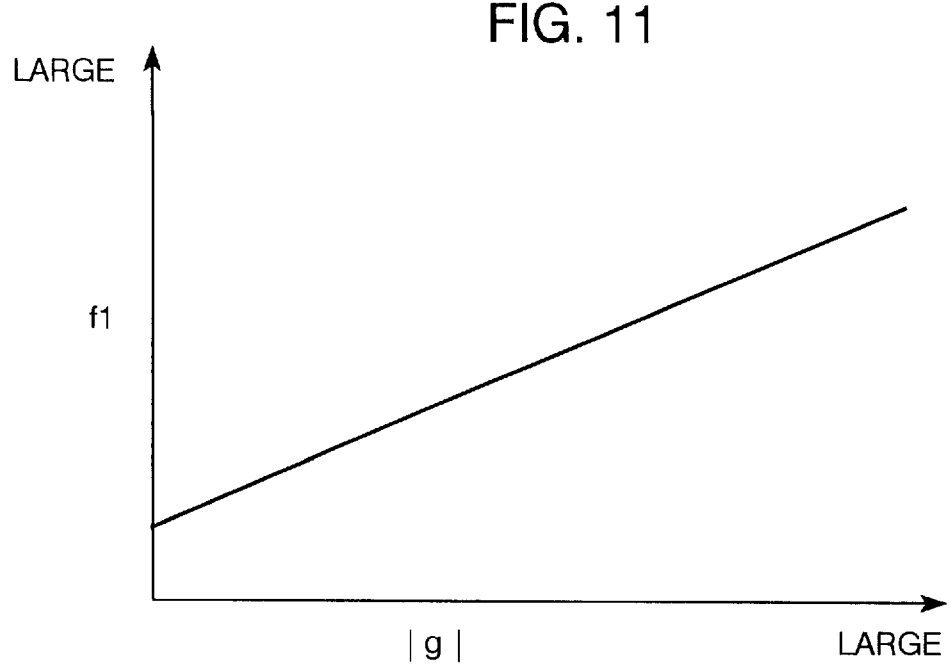
FIG. 11 is a graph showing a relationship between the function f1 and slope angle g.
Figure 12:
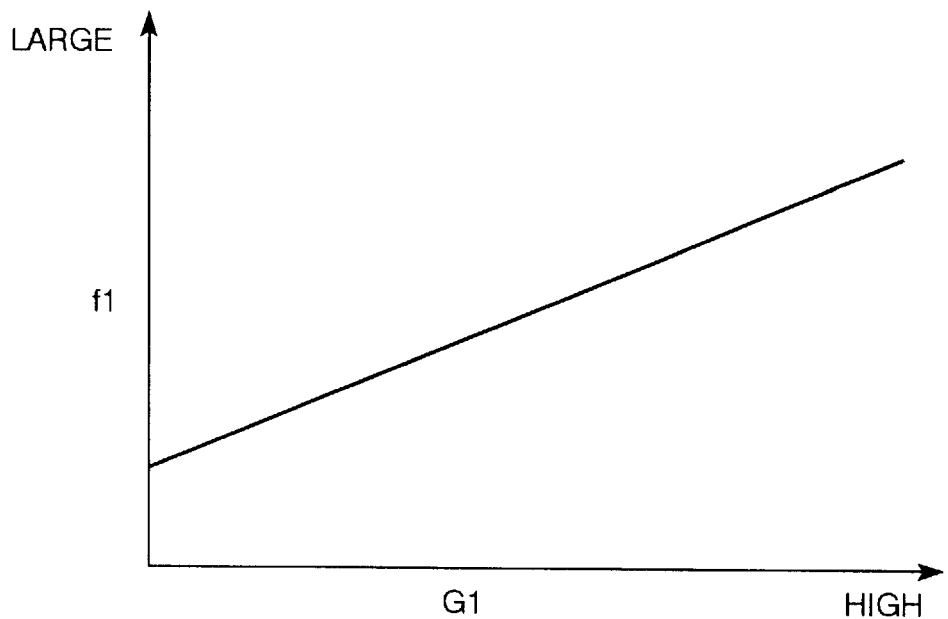
FIG. 12 is a graph showing a relationship between the function f1 and operating gear G1.
Figure 13:
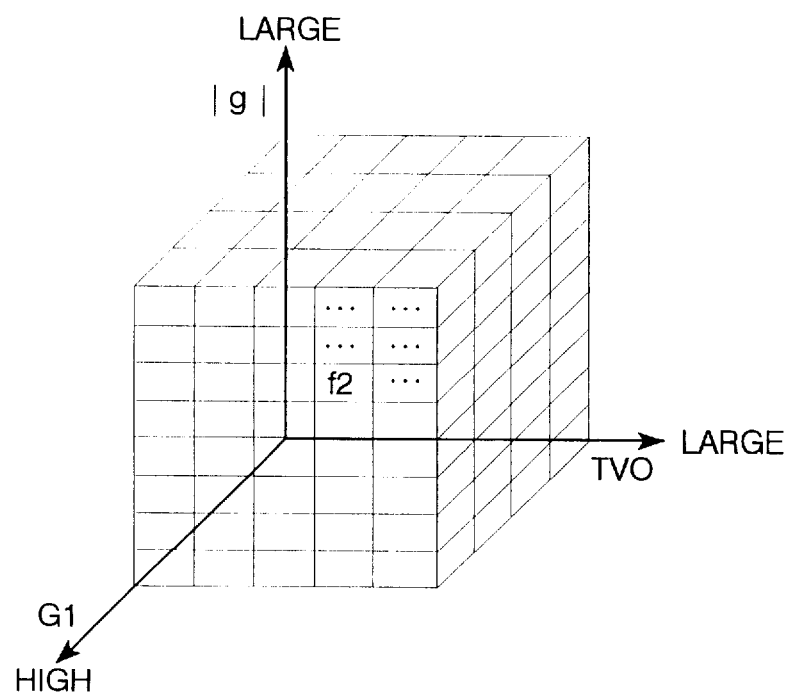
FIG. 13 is a conceptual table showing a relationship of a function f2 to slope angle g, throttle valve opening TVO and operating gear G1.
Figure 14:
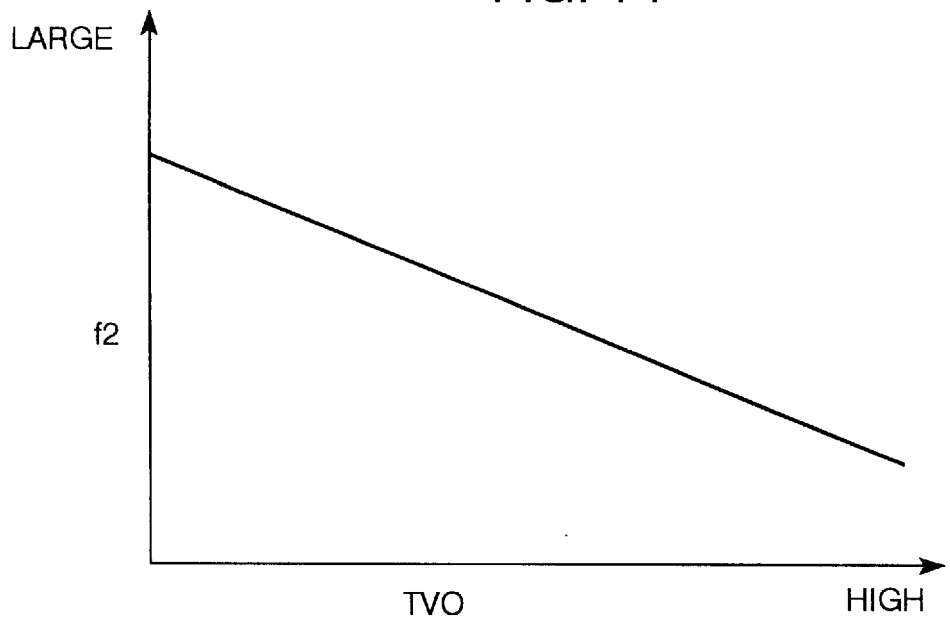
FIG. 14 is a graphical diagram showing a relationship between the function f2 and throttle valve opening TVO.
Figure 15:
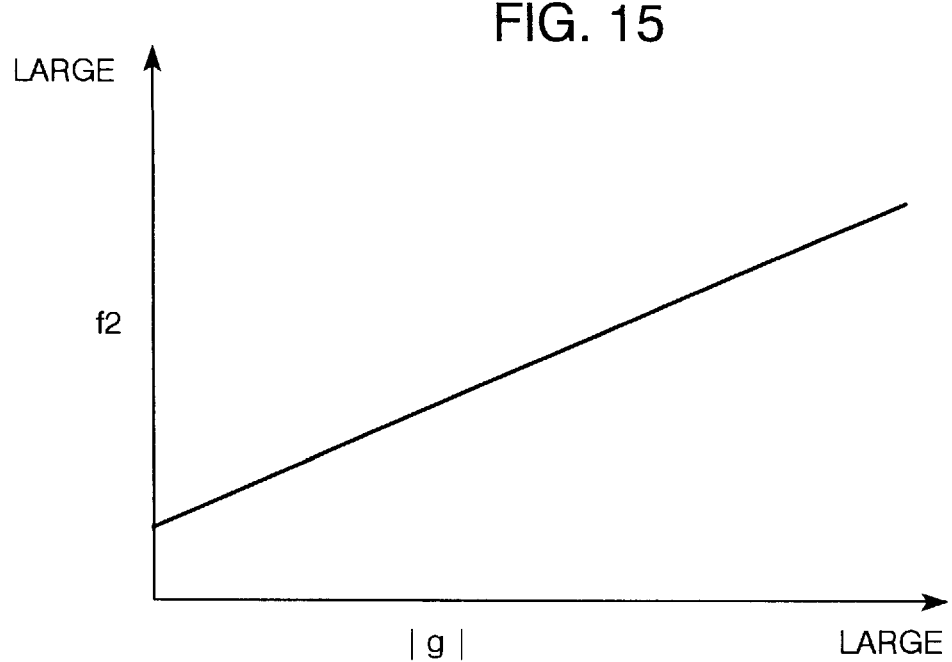
FIG. 15 is a graph showing a relationship between the function f2 and slope angle g.
Figure 16:
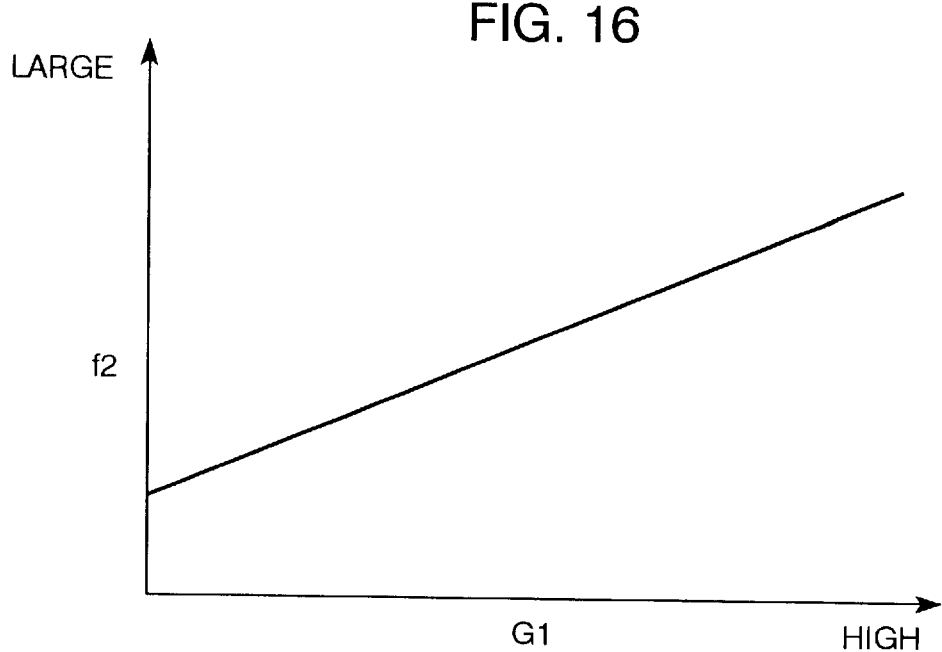
FIG. 16 is a graph showing a relationship between the function f2 and operating gear G1.

After reading in the shift gear G1 determined according to the downgrade gear shift control map shown in FIG. 4 at step S116, a reference speed change Fv and a reference duration of depression Ft are established on control maps at steps S117 and S118, respectively. These reference values Tv and Ft are necessary to judge that the map flag Fmap may be reset to the state of "0" from the state of "1". The reference speed change Fv is used to make a determination as to a change in vehicle speed V at step S122. As shown in FIG. 9, the reference speed change Fv is given by a function f1 of ex-idling vehicle speed Vi, slope angle g and the shift gear G1 for which a reference vehicle speed control map is set up. The function f1 increases as the ex-idling vehicle speed Vi becomes greater as shown in FIG. 10, as the lope angle g becomes greater as shown in FIG. 11, and as the shift gear G1 becomes higher. Consequently, the greater the ex-idling vehicle speed Vi is, the greater the slope angle g is, and/or the higher the shift gear G1 is, the more difficult a judgement made at step S122 tends to be affirmative unless the change in vehicle speed V is relatively great. The function f1 may be set up to vary stepwise. The reference duration of depression Ft is used to make a determination as to the length of time t for which the acceleration pedal 22 is continuously stepped on at step S121. As shown in FIG. 13, the reference duration of depression Ft is given by a function f2 of throttle valve opening TVO, slope angle g, and the shift gear G1 for which a reference duration map is set up. The function f2 increases as the throttle valve opening TVO becomes smaller as shown in FIG. 14, as the slope angle g becomes greater as shown in FIG. 15, and/or the shift gear G1 becomes higher as shown in FIG. 16. Consequently, the smaller the throttle valve opening TVO is, the steeper the slope is, and/or the higher the shift gear G1 is, the more difficult the judgement tends to be affirmative unless the length of time t for which the acceleration pedal 22 remains depressed is relatively long. The function f2 may be set up to vary stepwise. After having established the reference values Tv and Ft at steps S117 and S118, respectively, or after having counted up the count t of the time counter by one (1) at step S111, or a case where the answer to any one of the determinations at step S112, S113 and S114 is "NO," the control routing proceeds to steps S119 through S123 to judge that the map flag Fmap may be reset to the state of "0" or changed to the state of "0" from the state of "1". At step S119, a determination is made as to whether the slope flag Fg has been reset to the state of "0". When the slope flag Fg has been reset to the state of "0", this indicates that the vehicle is traveling on a flat road, then, the map flag Fmap is reset to the state of "0" at step S120. On the other hand, when the slope flag Fg has been to the state of "1", this indicates that the vehicle is traveling on a downgrade, then, determinations are consecutively made at steps S121, S122 and S123 as to whether the throttle valve is in the idle position, whether the vehicle has caused a change in speed greater than the reference speed change Fv, and whether the length of time t of depression of the acceleration pedal 22 is longer than the reference duration of depression Ft, respectively. When the throttle valve 14 is in the idle position, that is, when the accelerator pedal 22 is released, the map flag Fmap remains as previous. In cases where, when the accelerator pedal 22 is stepped on, the reference speed change Fv is exceeded or the reference duration of depression Ft is exceeded, the map flag Fmap is reset to the state of "0" at step S120. On the other hand, unless the reference speed change Fv is exceeded or unless the reference duration of depression Ft is exceeded, the map flag Fmap remains as previous. Specifically, in cases where, even when the reference speed change Fv is not exceeded, the accelerator pedal 22 remains depressed for a time t longer than the reference duration of depression Ft, the map flag Fmap is reset to the state of "0". In other words, the length of time t is used as a back-up time for the map flag control.

The map flag control changes the map flag Fmap in state according to vehicle driving conditions. Specifically, while the vehicle is driving on a flat road, because the slope flag Fg is reset to the state of "0" at step S107, the map flag Fmap is determined to be reset to the state of "0" at step S120 in spite of stepping on the footbrake pedal 13 or the accelerator pedal 22. As a result, the automatic transmission is controlled with the ordinary gear shift control map and causes gear shifts suitable for flat road driving. In cases where the slope flag Fg is set to the state of "1" as a result of entering a downgrade from a flat road, when the driver steps on or depresses the accelerator pedal 22 with intention of still accelerating the vehicle, the control routine takes steps S119 through S123 via steps S108 and S111. In such a case, because the slope flag Fg has been to the state of "1", the map flag Fmap holds the state of "0" or is reset to the state of "0" in spite of holding the accelerator pedal 22 stepped on. Further, in cases where both accelerator pedal 22 and footbrake pedal 13 are released, the control proceeds steps S119 and S121 after taking step S112 via steps 108 through 110. In such a case, because the slope flag Fg has been to the state of "1" and the throttle valve 14 is in the idle position, the map flag Fmap holds the state of "0". When the footbrake pedal 13 is stepped on, the control routine takes steps S108 through S113. Only if the footbrake pedal 13 is stepped on with the result of greater deceleration, the map flag Fmap is set to the state of "1" at step S115. As a result, the automatic transmission is controlled with the downgrade gear shift control map to provide gears which apply more effective engine braking during downgrade driving.

In this way, even after having set the slope flag Fg to the state of "1," the map flag Fmap is set to the state of "1" only when the footbrake is applied with the result of greater deceleration. This remains stable drivability when the vehicle is changed to lower gears which apply more effective engine braking, and gear shifts reflect the driver's intention of decelerating the vehicle during downgrade driving.

In this instance, as was previously described, since both first reference angle K1 and reference deceleration rate A are varied smaller when the shift gear G is high than when the shift gear G is low, the threshold level for the downgrade gear shift control is relieved while the gear remains in the fourth before execution of the downgrade gear shift control, resulting in easily causing a down shift from the fourth gear to the third gear. On the other hand, the threshold level for the downgrade gear shift control is made strict while the gear remains in the third before execution of the downgrade gear shift control, resulting in hardly causing a down shift from the third gear to the second gear. Accordingly, while the vehicle is driving on a downgrade with the fourth gear which provides less effective engine braking, a down shift is quickly caused to the third gear, providing an increase in engine braking earlier. On the other hand, while the vehicle is driving on a downgrade with the third gear, a gear shift is caused to the second gear which provides more effective engine braking only when the footbrake pedal is strongly stepped on to an extent which causes notably great deceleration. At this time, since the third gear does not provide considerably strong engine braking, the driver and passengers do not have an unpleasant feeling of deceleration even when a fourth-to-third down shift occurs quickly. On the other hand, a third-to-second down shift is not so quickly caused and concluded after the vehicle has greatly decelerated, the driver does not experience a shift shock due to more effective engine braking caused by the second gear as an unpleasant feeling. When the vehicle comes out of a downgrade and enters a flat road, the slope flag Fg is reset to the state of "0" at step S107 and the map flag Fmap is consequently reset to the state of "0" at step S120. As a result, the automatic transmission is controlled with the ordinary gear shift control map and causes gear shifts suitable for flat road driving.

Further, in the gear shift control employing the map flag control, even while the vehicle is driving on a downgrade, the map flag Fmap is reset to the state of "0" in cases where the control routine takes steps S119 through S121 via step S111 as a result of stepping on the accelerator pedal 22, and subsequently takes step S122 or S123. The case where the control routine proceeds via step S122 takes place when the reference speed change Fv is exceeded. In other words, since the event that the reference speed change Fv is exceeded results from continuous depression of the accelerator pedal 22 of long duration until the reference speed change Fv is exceeded, it be determined that the driver has no intention of applying engine brakes and, however, has intention of accelerating the vehicle. In this event, the utilization is made of the ordinary gear shift control map, in place of the downgrade gear shift control map, even during downgrade driving. By means of this gear shift control, gear shifts reflect precisely driver's intention and provide a favorable drive feeling.

The case where the control proceeds via step S123 takes place when the reference duration of depression Ft is exceeded. In other words, since the event that the reference duration of depression Ft is exceeded results from depression of the accelerator pedal 22 of long duration, it be determined that the driver has intention of accelerating the vehicle. Also in this event, the utilization is made of the ordinary gear shift control map, in place of the downgrade gear shift control map, even during downgrade driving. In this instance, since, in view of the reliability of gear shift control, it is desirable to reset the map flag Fmap from the state of "1" to the state of "0" after an occurrence of a pronounced increase in vehicle speed, the determination as to the reference duration of depression Ft is made at step S123 as a backup means for cases where the judgement at step S122 is negative.

The reference speed change Fv is changed greater with an increase in ex-idling vehicle speed Vi with an tendency to make the map flag Fmap be hardly changeable to the state of "0". Accordingly, while the vehicle is travelling at high speeds, the automatic transmission is prevented from producing significant shift shocks due to downshifts to lower gears when the map flag Fmap is set again to the state of "1". Further, the reference speed change Fv becomes greater with a decrease in slope angle g with an tendency to make the map flag Fmap be hardly changeable to the state of "0". Accordingly, during driving on a sharp downgrade which makes it necessary to apply engine brakes, the map flag Fmap is prevented from changing to the state of "0" unless the vehicle attains a considerably high speed, and the vehicle can travel with engine brakes applied effectively as much as possible. Conversely, during driving on a gentle downgrade, the map flag Fmap changes to the state of "0" before the vehicle attains a significantly high speed. As a result, the vehicle is placed free from engine brakes a little earlier and, consequently, provides favorable drive feelings meeting the driver's intention.

The reference duration of depression Ft becomes longer as the shift gear G1 becomes higher so as to make the map flag Fmap be hardly changeable to the state of "0". That is, the removal condition of the downgrade gear shift control is made more strict when a fourth-to-third shift down is caused through the downgrade gear shift than when a third-to-second shift down is caused through the downgrade gear shift. In the event where a down shift is made to the third gear through the downgrade gear shift, because the third gear provide relatively less effective engine braking, it is easy to increase the vehicle speed V in a short period of time through depression of the accelerator pedal 22, so that the reference speed change Fv is exceeded before long from the depression of the accelerator pedal 22. As a result, the map flag Fmap is quickly reset to the state of "0" to permit early an up shift to the fourth gear which provides less engine braking. Because the fourth gear does not provide engine braking almost at all, while the vehicle is driving on a long downgrade, the driver tries to apply brakes once again at an early time. This results in setting the map flag Fmap to the state of "1" in a short period of time, and there occurs frequent hunting of the down gear shift control between execution and removal. Resultingly, the vehicle encounters aggravation of driving performance. This hunting is prevented by making the removal condition of the downgrade gear shift control more strict by increasing the reference speed change Fv.

In cases where the downgrade gear shift control causes a down shift to the second gear which provides more effective engine braking, the removal condition of the downgrade gear shift control is made more lenient by decreasing the reference speed change Fv. As a result, an up shift to the third gear is caused at an early time, quickly terminating a state of excessive engine braking due to a change in slope of the downgrade and permitting smooth downgrade driving.

The reference duration of depression Ft becomes longer as the throttle valve opening TVO becomes smaller so as to make the map flag Fmap be hardly changeable to the state of "0". Accordingly, while the footbrake pedal 13 is stepped on, but not so hard, the map flag Fmap is prevented from changing to the state of "0". This prevents unfavorable feelings resulting from the gear shift control with the ordinary gear shift control map while the footbrake pedal 13 is stepped on a little with intention of recovering the vehicle speed. Further, the reference duration of depression Ft becomes greater with a decrease in slope angle g with an tendency to make the map flag Fmap be hardly changeable to the state of "0". Accordingly, during driving on a sharp downgrade which makes it necessary to apply engine brakes, the map flag Fmap is prevented from changing to the state of "0" unless the footbrake pedal 13 is continuously stepped on for a considerably long time, and the vehicle can travel with engine brakes applied effectively as much as possible. Conversely, during driving on a gentle downgrade, the map flag Fmap changes to the state of "0" even after depression of the accelerator pedal 22 of short duration. As a result, the vehicle is placed free from engine brakes a little earlier and, consequently, provides favorable drive feelings meeting the driver's intention.

The reference duration of depression Ft becomes greater with a decrease in slope angle g with an tendency to make the map flag Fmap be hardly changeable to the state of "0". That is, the reference duration of depression Ft is made more strict during the downgrade gear shift control when a shift down is made from the fourth gear to the third gear than when a shift down is made from the third gear to the second gear. By this means, both hunting of the down gear shift control between execution and removal which occurs following a shift down to the third gear caused by the downgrade gear shift control and continuous apply of excessive engine braking which occurs following a shift down to the second gear caused by the downgrade gear shift control are eliminated, ensuring smooth downgrade driving.

Figure 17:
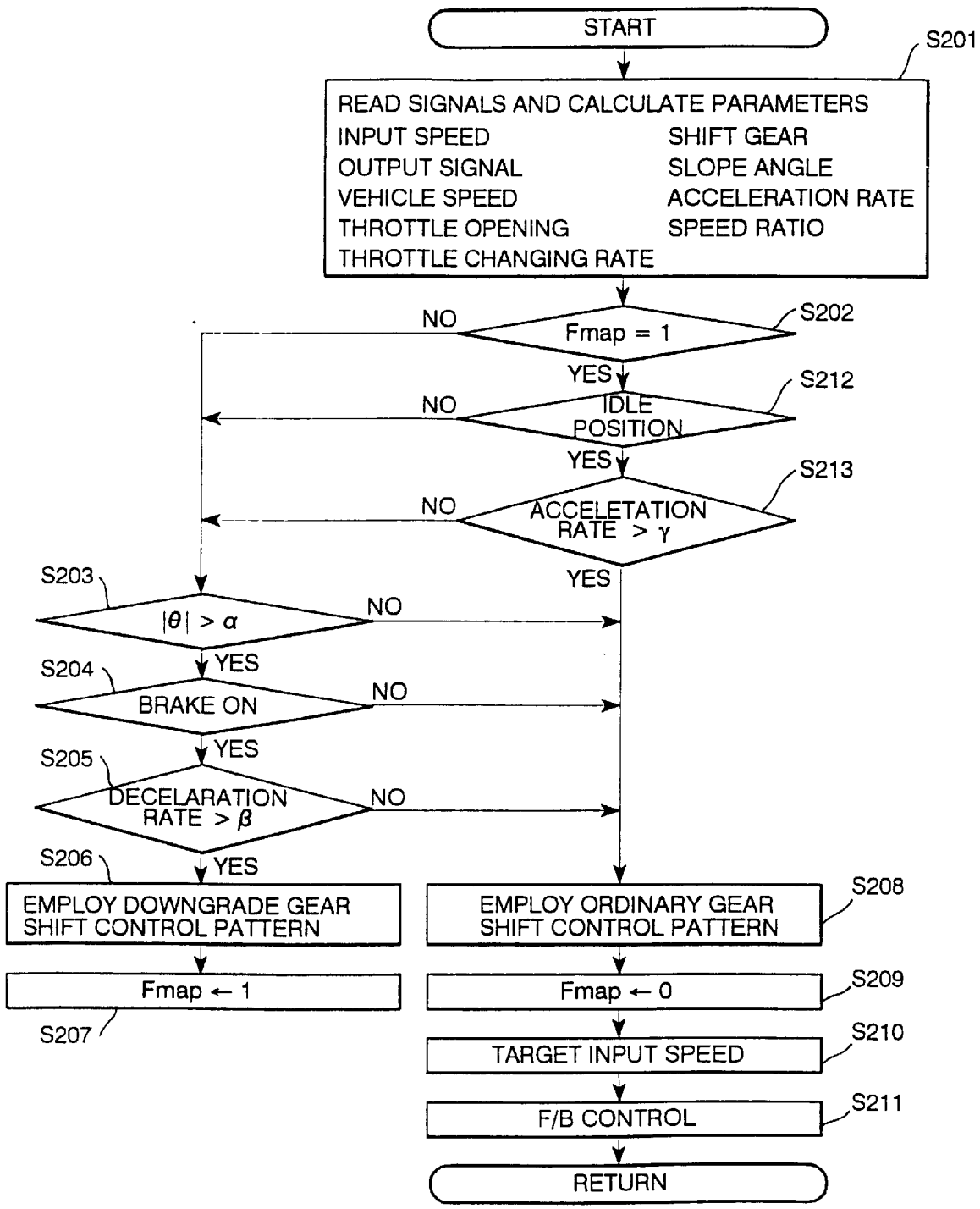
FIG. 17 a flowchart illustrating the gear shift control routine for a continuously variable automatic transmission.

FIG. 17 is a flowchart illustrating a sequence routine of the gear shift control according to an embodiment of the invention which is applied to a continuously variable automatic transmission.

Figure 18:
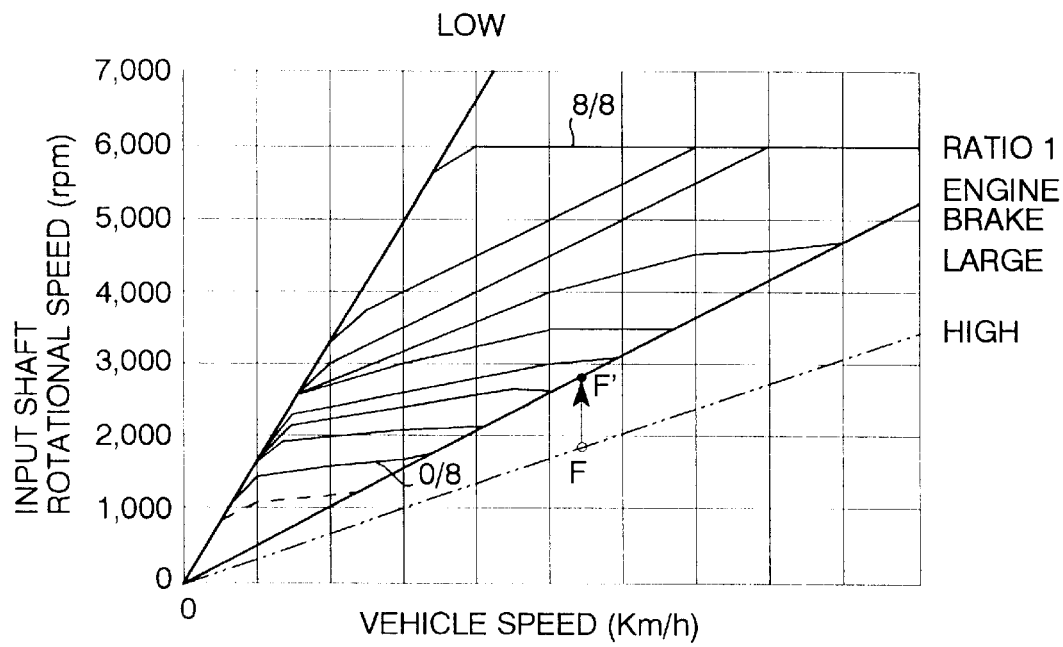
FIG. 18 is an ordinary gear shift control pattern set up for ordinary or flat road driving.
Figure 19:
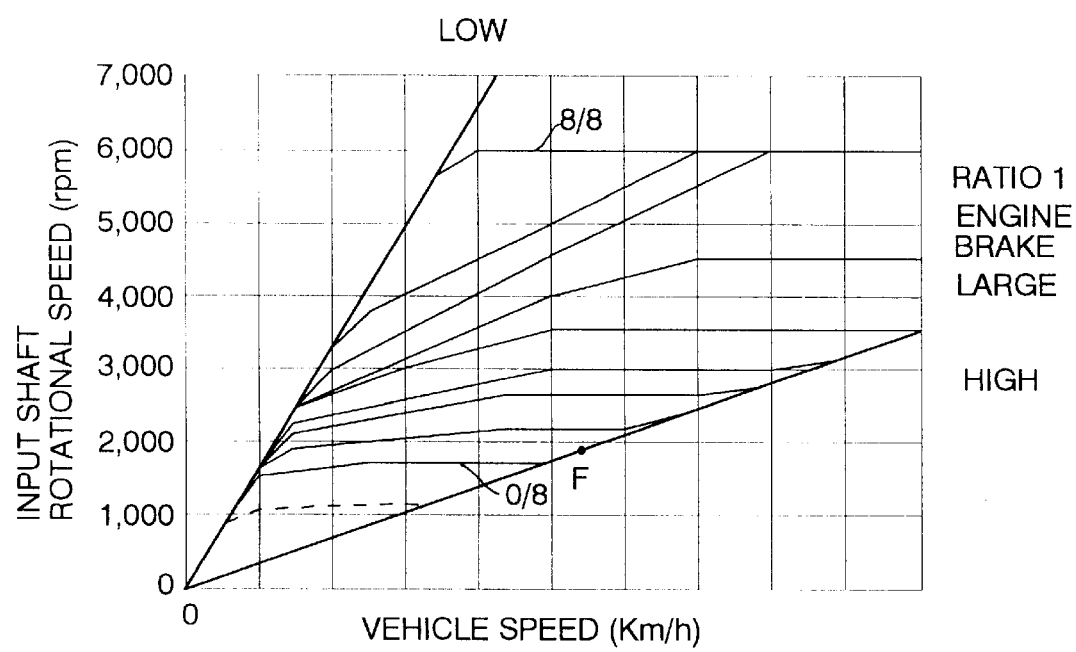
FIG. 19 is a downgrade gear shift control pattern set up for downgrade driving.

The flowchart logic commences and control passes directly to a function block at step S201 where signals are read in from various sensors 15–19, based on which various control parameters are calculated. These parameters include input and rotational speeds of output shafts of the continuously variable automatic transmission, a speed ratio of an output speed relative to input speed (input-to-output speed ratio), a vehicle speed, a throttle valve opening or a changing rate of the throttle valve opening, a slope angle of a road, a longitudinal acceleration rate, etc. Subsequently, a determination is made at step S202 as to whether a map flag Fmap has been set to the state of "1". If the map flag is down, this indicates that the ordinary gear shift control is employed, then, determinations are consecutively made at steps S203, 204 and 205 as to driving conditions including slope angle α of a road on which the vehicle is driving, application of footbrakes and deceleration rate β. In cases where the vehicle is driving under conditions that the slope angle exceeds a reference slope angle α, the footbrake pedal is stepped on, and the vehicle changes its speed at a deceleration rate greater than a reference deceleration rate β, after employing a downgrade gear shift control pattern such as shown in FIG. 18 at step S206, the map flag Fmap is set to the state of "1" at step S207. However, if any one of these conditions is negative, then, after employing an ordinary gear shift control pattern such as shown in FIG. 19 at step S208, the map flag Fmap is reset to the state of "0" at step S209. After setting the map flag Fmap at step S207 or resetting the map flag Fmap at step S209, a target input rotational speed is calculated based on the employed gear shift control pattern at step S210. Finally, the continuously variable automatic transmission is controlled by a control pulse through feedback gear shift control so as to develop the target input rotational speed at step S211.

As understood from FIGS. 18 and 19, a gear shift line set up for the highest input-to-output speed ratio (which provides less engine braking), labeled "HIGH", is drawn closer to a gear shift line set up for the lowest input-to-output speed ratio, labeled "LOW", on the downgrade gear shift control pattern as labeled "RATIO 1" in FIG. 18 than on the ordinary gear shift control pattern shown in FIG. 19. Supposing that the vehicle is driving under conditions of a throttle valve opening of 0/8 and a vehicle speed indicated by a label "F" during ordinary gear shift control, when the gear shift control is changed to the downgrade gear shift control pattern, the target input rotational speed is boosted as shown by a label "F'" in FIG. 18, resulting in a decrease in input-to-output speed ratio which provides more effective engine braking.

Figure 20:
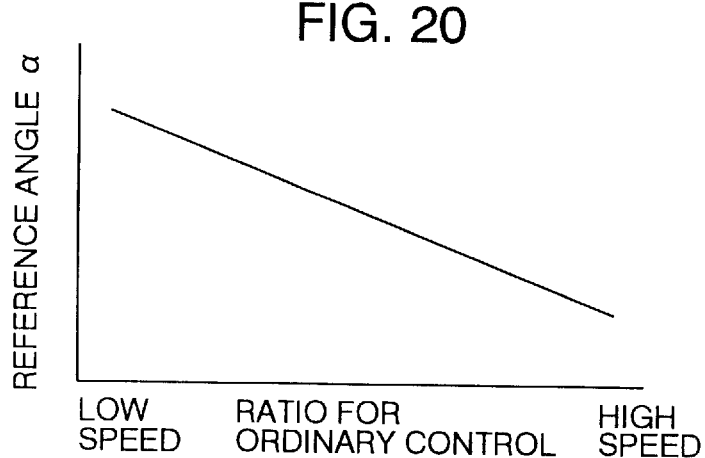
FIG. 20 is a graphical diagram showing a relationship between reference slope angle α and speed ratio during ordinary gear shift control.
Figure 21:
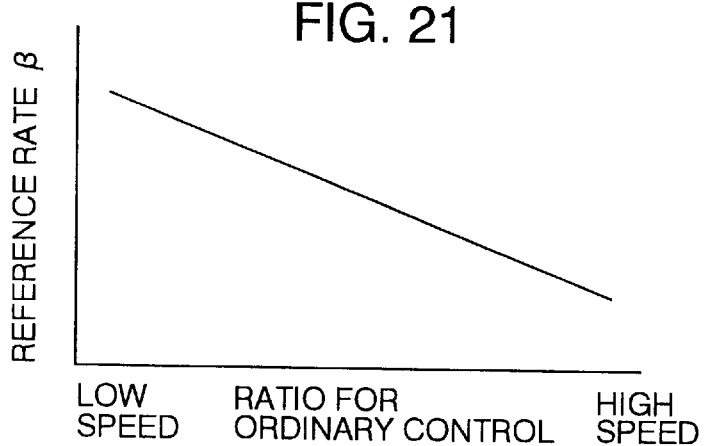
FIG. 21 is a graphical diagram showing a relationship between reference deceleration rate β and speed ratio during ordinary gear shift control.

Parameters, such as the slope angle α and deceleration rate β, necessary to make a determination as to the downgrade gear shift control are previously established as shown in FIGS. 20 and 21. Specifically, as shown in FIG. 20, each of the reference slope angle α and deceleration rate β varies to become smaller with an increase in input-to-output speed ratio during execution of the ordinary gear shift control. Accordingly, in cases where the input-to-output speed ratio before execution of the downgrade gear shift control is high and engine braking is consequently ineffective, the execution condition of the downgrade gear shift control is made more lenient with an effect of quickly increasing engine braking force. In cases where the input-to-output speed ratio before execution of the downgrade gear shift control is low and engine braking is effective, the execution condition of the downgrade gear shift control is made more strict with an effect of preventing excessive engine braking force.

Figure 22:
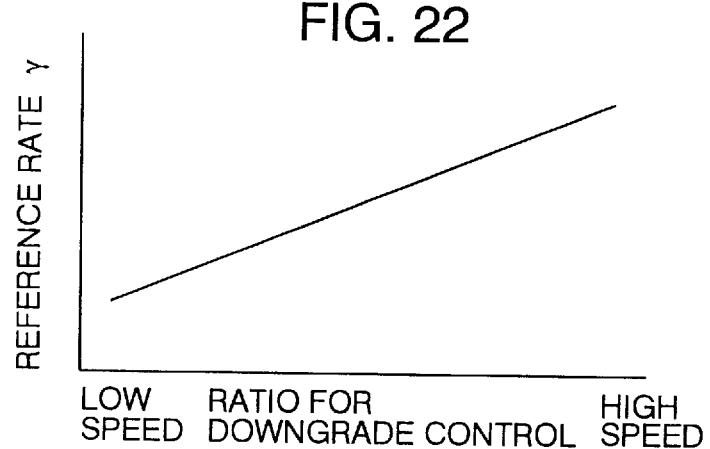
FIG. 22 is a graphical diagram showing a relationship between reference acceleration rate γ and speed ratio during downgrade gear shift control.

On the other hand, if the answer to the determination made concerning the map flag Fmap at step S202 is "YES," this indicates that the gear shift is under the downgrade gear shift control, determinations are made at steps S212 and S213 as to engine idling footbrakes and acceleration rate γ, respectively. In cases where the vehicle is driving under conditions that the throttle valve is out of the idle position and the vehicle changes its speed at an acceleration rate greater than a reference acceleration rate γ, the ordinary gear shift control pattern is employed at step S208. By this means, when the accelerator pedal is stepped on and, as a result, the vehicle speeds up at a rate greater than the reference acceleration rate γ even during downgrade driving, the ordinary gear shift control is employed in place of the downgrade gear shift control. In this instance, the acceleration rate γ necessary to make a determination as to removal of the downgrade gear shift control is previously established such that, as shown in FIG. 22, the acceleration rate γ varies to become greater with an increase in input-to-output speed ratio during execution of the downgrade gear shift control. Accordingly, in cases where the input-to-output speed ratio during execution of the downgrade gear shift control is high and engine braking is ineffective, the removal condition of the downgrade gear shift control is made more strict with an effect of preventing a decrease in engine braking force. On the other hand, in cases where the input-to-output speed ratio during execution of the downgrade gear shift control is low and engine braking is excessively applied, the removal condition of the downgrade gear shift control is made more lenient with an effect of providing moderate engine braking force, ensuring smooth downgrade driving.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A gear shift control system for controlling gear shifts of an automatic transmission of an automotive vehicle, which executes gear shift control based on an ordinary gear shift control map during ordinary road driving or on a downgrade gear shift control map, in which a range of driving conditions for a low gear is defined broader than in the ordinary gear shift control map, during driving on a downgrade having a slope angle greater than a specified angle, said gear shift control system comprising:

accelerator monitoring means for monitoring depression of an accelerator pedal and an amount of said depression of the accelerator pedal;

speed monitor means for monitoring a vehicle speed of the vehicle;

map control means for calculating a change in said vehicle speed per a specified time, and employing the ordinary gear shift control map in the gear shift control of the automatic transmission even during driving on a downgrade having a slope angle greater than said specified angle, when said change exceeds a reference speed change after said depression of the accelerator pedal and said amount of depression exceeds a reference amount of depression.

2. A gear shift control system as defined in claim 1, wherein said reference change is changed greater with an increase in slope angle.

3. A gear shift control system as defined in claim 1, wherein said reference change is changed greater with an increase in said vehicle speed after the accelerator pedal is depressed more than said reference amount of depression.

4. A gear shift control system as defined in claim 1, wherein said map control means holds the ordinary gear shift control map in the gear shift control even during driving on a downgrade having a slope angle greater than said specified angle unless a footbrake pedal is stepped on.

5. A gear shift control system as defined in claim 1, wherein said accelerator monitoring means monitors opening of an engine throttle valve as said amount of depression of the accelerator pedal.

6. A gear shift control system for controlling gear shifts of an automatic transmission of an automotive vehicle, which executes gear shift control based on an ordinary gear shift control map during ordinary road driving or on a downgrade gear shift control map, in which a range of driving conditions for a low gear is defined broader than in the ordinary gear shift control map, during driving on a downgrade having a slope angle greater than a specified angle, said gear shift control system comprising:

accelerator monitoring means for monitoring depression of an accelerator pedal and an amount of said depression of the accelerator pedal;

gear shift map exchanging means for monitoring a time for which the accelerator pedal remains depressed, and employing the downgrade gear shift control map in the gear shift control of the automatic transmission during driving on a downgrade having a slope angle greater than said specified angle when said time exceeds a reference time after said depression of the accelerator pedal and said amount of depression of the accelerator pedal exceeds a reference amount of depression.

7. A gear shift control system as defined in claim 6, wherein said reference time is changed longer with an increase in slope angle.

8. A gear shift control system as defined in claim 6, wherein said reference time is changed longer with a decrease in said amount of depression of the accelerator pedal.

9. A gear shift control system as defined in claim 6, wherein said map control means holds the ordinary gear shift control map employed in the gear shift control even during driving on a downgrade having a slope angle greater than said specified angle unless a footbrake pedal is stepped on.

10. A gear shift control system as defined in claim 6, wherein said accelerator monitoring means monitors opening of an engine throttle valve as said amount of depression of the accelerator pedal.

11. A gear control system for controlling gear shifts of an automatic transmission of an automotive vehicle, which executes gear shift control based on an ordinary gear shift control pattern set up for set up for ordinary road driving conditions or on a downgrade gear shift control pattern set up for downgrade driving conditions, in which each gear shift control line is set up for driving conditions on a side of vehicle speed higher than in the ordinary gear shift control pattern, said gear shift control system comprising:

accelerator monitoring means for monitoring accelerating operation by a driver;

braking operation monitoring means for monitoring operation of a brake by a driver;

gear monitoring means for monitoring an operating gear of the automatic transmission;

control means for resuming the gear shift control based on the ordinary gear shift control pattern following removal of the gear shift control based on the downgrade gear shift control pattern when said accelerator monitoring means monitors accelerating operation greater than a specified amount of accelerating operation during downgrade driving, and altering said specified amount of accelerating operation so as to be attained more easily when said operating gear is lower than when higher.

12. A gear shift control system as defined in claim 11, wherein said accelerator monitoring means monitors an acceleration rate caused by depression of an accelerator pedal by a driver.

13. A gear shift control system as defined in claim 12, wherein said specified amount of accelerating operation is a specified acceleration rate.

14. A gear shift control system as defined in claim 13, wherein said specified acceleration rate is altered smaller as said operating gear becomes lower.

* * * * *